Patented Nov. 13, 1962

3,064,000
S-BENZOYLTHIAMINE O-MONOPHOSPHATE AND A PROCESS FOR PREPARING THE SAME
Akira Ito, Wataru Hamanaka, Hiromu Takagi, Tadao Wada, and Katsuro Kawada, Shinagawaku, Tokyo, Japan, assignors to Sankyo Kabushiki Kaisha, Tokyo, Japan
No Drawing. Filed Apr. 5, 1960, Ser. No. 20,025
Claims priority, application Japan Apr. 14, 1959
8 Claims. (Cl. 260—256.5)

This invention relates to a novel thiamine derivative, S-benzoylthiamine O-monophosphate of the following structural formula

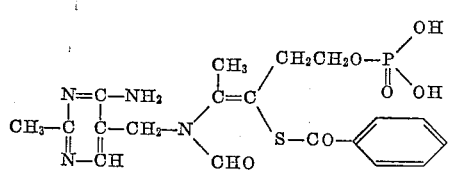

and salts thereof, and it further relates to a process for preparing these compounds. These compounds are useful as therapeutics and nutrients.

It is the object of this invention to provide novel S-benzoylthiamine O-monophosphate and salts thereof which, possess thiamine potency for organisms, and, when administered, may be highly absorbed and produce very high and durable increase in thiamine levels in the body as compared with thiamine hydrochloride. Another object of this invention is to provide a process for preparing S-benzoylthiamine O-monophosphate and salts thereof possessing such excellent characteristics. Other objects and advantages of this invention will be readily apparent from the following detailed description thereof.

It is hiterto well known that thiamine hydrochloride is an important compound for therapy and nutrition. However, because of low absorption and short-duration of thiamine hydrochloride in the body it is desirable to obtain thiamine derivatives having higher absorption and longer duration in the body than thiamine hydrochloride.

As a result of studies for obtaining useful derivatives of thiamine satisfying such requisites, unexpectedly, we have discovered that S-benzoylthiamine O-monophosphate may produce a surprisingly high and durable increase in thiamine levels in the body in comparison with thiamine hydrochloride, thus sufficiently fulfilling the aforementioned requirement.

The following experimental data will evidently show that S-benzoylthiamine O-monophosphate and salts thereof, such as, for example, sodium salt, of this invention, when administered, may be much readily absorbed and produce very high and durable increase in thiamine levels in the body as compared with known thiamine derivatives such as thiamine hydrochloride.

I. BLOOD LEVELS IN DOGS (1) *Method.*—As test samples were used crystals of S-benzoylthiamine O-monophosphate of the aforementioned structural formula and sodium salt thereof and thiamine hydrochloride standardized by Japanese Pharmacopeia. They were orally administered to dogs in amounts of 4.49 mg. of S-benzoylthiamine O-monophosphate (containing 2 molecules of crystal water) (equivalent to 3 mg. of thiamine hydrochloride), 4.54 mg. of disodium salt of the said thiamine ester (the equivalent amount) and 3 mg. of thiamine hydrochloride respectively per kg. of bodyweight of dog.

Cross-bred female dogs weighing 14.4 kg., 13.4 kg. and 7.9 kg. were used as the experimental animals. They were given dog food (manufactured by Japan Cold-Storage Company, Ltd.) for 2 days before administration of the test agent and fasted for 24 hours before and during drawing of blood in order to maintain blood-thiamine level as constant as possible and prevent variation in experimental conditions.

Blood was drawn from the vein of foreleg cubitus of the experimental animal accurately in amount of 2 cc. before and at definite intervals after administration of the aforementioned test sample. The blood from each drawing was immediately dissolved in 12 cc. of distilled water and the amount of total thiamine was determined by the thiochrome fluorimetric method.

(2) *Result.*—The results are given in Table I.

*Table I*
BLOOD LEVEL OF TOTAL THIAMINE IN DOGS AFTER ORAL ADMINISTRATION

| Test sample and dosage, mg./kg. bodyweight | Test No. | Body-weight of dog, kg. | Blood-thiamine level, γ percent | | | | | | | | | |
|---|---|---|---|---|---|---|---|---|---|---|---|---|
| | | | Before adminis-tration | After administration, hr. | | | | | | | | |
| | | | | 1 | 2 | 3 | 4 | 5 | 6 | 7 | 8 | 9 | 10 |
| Thiamine hydrochloride, 3 mgs./kg | 1 | 14.4 | 9.0 | 18.6 | 26.5 | ----- | 19.1 | ----- | 12.0 | ----- | ----- | ----- | 9.0 |
| | 2 | 13.4 | 9.0 | 26.7 | 22.4 | ----- | 14.7 | ----- | 12.0 | ----- | ----- | ----- | 9.0 |
| S-benzoylthiamine, O-monophosphate (2H₂O), 4.49 mgs./kg | 3 | 13.4 | 9.0 | 157.1 | 81.4 | ----- | 46.9 | ----- | 37.4 | ----- | ----- | ----- | 24.8 |
| Disodium S-benzoyl thiamine, O-monophosphate, 4.54 mgs./kg | 4 | 7.9 | 8.8 | 78.1 | ----- | 53.6 | ----- | 36.0 | ----- | ----- | 26.9 | ----- | ----- |

As shown in the table, the blood-thiamine levels in the cases with S-benzoylthiamine O-monophosphate and disodium salt thereof reach the maximum within 1–2 hours. It is surprising that the maximum increased amounts of blood thiamine after administration of S-benzoylthiamine O-monophosphate and disodium salt thereof are about 4–8 times as much as those after administration of thiamine hydrochloride. That is, those in the former two cases are respectively 148.1 and 69.3γ%, while those in the latter case are 17.5 and 17.7γ%. Furthermore, the blood-thiamine levels following administration of the compounds of this invention are significantly higher even 6–8 hours after administration than those following administration of thiamine hydrochloride.

II. URINARY EXCRETION IN MEN (1) *Method.*—Test samples used and method of thiamine assay were same as in the previous experiment. Thiamine excretions in urine in adult men in a period of 24 hours after oral administration were determined without limitation of work and food.

(2) *Results.*—the results are shown in Table II.

*Table II*

| Test sample (dosage, mg./kg. bodyweight) | Test No. | Body-weight, kg. and age of man | Thiamine excretion in urine in 24 hours, λ |
|---|---|---|---|
| Thiamine hydrochloride, 1 mg./kg. | 1 | 60, 24 | 1,029 |
|  | 2 | 72, 32 | 1,008 |
| S-benzoylthiamine O-monophosphate ($2H_2O$), 1.49 mgs./kg. | 3 | 60, 24 | 14,230 |
|  | 4 | 72, 32 | 25,250 |

The data in the table apparently show that the thiamine amounts excreted in urine after administration of S-benzoylthiamine O-monophosphate are 14–25 times as much as those after administration of thiamine hydrochloride, thus demonstrating that the former compound may be far more readily absorbed in the body than the latter.

(3) *Other biological characteristics of S-benzoylthiamine O-monophosphate.*—S-benzoylthiamine O-monophosphate of this invention has lower toxicity than thiamine hydrochloride as shown in Table III.

*TABLE III*

ACUTE TOXICITY IN A-CLASS CROSS-BRED MICE, $LD_{50}$ IN MG./G. BODYWEIGHT

|  | Method of administration | |
|---|---|---|
|  | Per os | Intra-venous injection |
| Thiamine hydrochloride | 9 | 0.1 |
| S-benzoylthiamine, O-monophosphate | 15 | 2.2 |

S-benzoylthiamine O-monophosphate of this invention is resistant to aneurinase I and II, thiamine-destroying enzymes produced by cultivation of *Bacillus thiaminolyticus* Matsukawa et Misawa and *Bacillu aneurinolyticus* Kimura et Aoyama respectively.

S-benzoylthiamine O-monophosphate of this invention is prominent in that it may be readily converted to active form of thiamine in the body and it may be readily utilized in the body as the thiamine source. Moreover, this thiamine derivative may be readily absorbed in the body maintaining thiamine levels of viscera high for a long period of time. Therefore, it is very useful for remedies especially in some human diseases where known thiamine derivatives such as thiamine hydrochloride are not effective.

According to the present invention, S-benzoylthiamine O-monophosphate described above may be prepared in the following ways.

(1) Thiamine monophosphate is reacted with benzoyl chloride under such condition as at pH of about 7–14. This reaction may be effected by treating the reactants in water or an aqueous organic solvent such as aqueous methanol, aqueous ethanol or aqueous acetone under such alkaline condition as at pH of about 7–14, preferably at pH of about 9–12. The reaction temperature may be varied depending upon the pH of the reaction mixture, and in practice, temperatures below those inducing decomposition of thioltype thiamine at that pH are applied. In practice, it is preferable to carry out the reaction at temperatures of about 0–30° C., especially at about 5–20° C. Molar ratio of the reactants used is theoretically 1:1, but 1.5–3 moles of benzoyl chloride per 1 mole of thiamine monophosphate are preferably used. When water is used as the reaction medium, the reaction mixture after completion of the reaction, with or without concentration, is acidified (for example, to pH of 3.5–4) with an acid such as hydrochloric or sulfuric acid, followed by filtration of the precipitates to obtain the desired product. If an aqueous organic solvent is used as the reaction medium, the reaction mixture after completion of the reaction is concentrated to remove the organic solvent, the concentrate acidified with an acid and the precipitates thus formed filtered to obtain the desired product.

(2) Thiamine monophosphate is reacted with sodium benzoylthiosulfate ($C_6H_5COSSO_3Na$) under such condition as at pH of about 7–14. This reaction may be effected by treating the reactants under such alkaline condition as at pH of about 7–14, preferably at pH of about 10–13, in water or an aqueous organic solvent such as aqueous methanol, aqueous ethanol or aqueous acetone. The reaction temperature may be varied depending upon the pH at which the reaction is carried out, and in practice, the reacting is conducted at temperatures below those causing decomposition of thiol-type thiamine at that pH. It is preferable to carry out the reaction at temperatures of about 0–30° C., especially at about 5–20° C. The molar ratio of the reactants is theoretically 1:1, but 1.5–3 moles of sodium benzoylthiosulfate to 1 mole of thiamine monophosphate is preferably used in practice. On actual commercial production, it is preferable to treat thiamine monophosphate with sodium benzoylthiosulfate in a molar ratio of 1:1.5–2.0 at pH of about 11–12 and at temperature of about 20° C. for a period of about 1–2 hours. After completion of the reaction, the desired product, S-benzoylthiamine O-monophosphate, is obtained from the reaction mixture in the same way as described under item I. When water is used as the reaction medium, the reaction mixture with or without concentration is acidified (for example, to pH 3.5–4) with an acid such as hydrochloric or sulfuric acid. The precipitates thus formed are then isolated by filtration to obtain the desired product. If an aqueous organic solvent is used as the reaction medium, the reaction mixture is concentrated to remove the organic solvent, followed by acidifying with acid in the same way as described above. The precipitates thus formed are isolated by filtration to obtain the desired product.

The use of sodium benzoylthiosulfate for the purpose of acylation is not hithertofore unknown. We have found that this compound may be effectively employed as an acylating agent. Therefore, the acylation reaction described above is a novel process for acylation. Moreover, it is advantageous that the production of S-benzoylthiamine O-monophosphate in accordance with this reaction process results in higher yield of the desired product that that in the use of benzoyl chloride in the process as under item I.

(3) Thiamine monophosphate is reacted with dibenzoyl disulfide ($C_6H_5COSSCOC_6H_5$): In carrying out the reaction, pH is chosen between about 7–14, preferably between about 11–13 to maintain the reaction mixture alkaline. It is preferable to carry out the reaction at temperatures below those which cause decomposition of thiol-type thiamine at that pH, such as for example, of the range between 5–30° C., desirably between 5–20° C. This reaction is conducted by adding thiamine monophosphate to an aqueous organic solvent such as aqueous methanol, aqueous ethanol or aqueous acetone, controlling the pH to the range described above and then adding a solution of dibenzoyl dissulfide dissolved in an organic solvent such as chloroform or dischloroethane to the resulting mixture.

After completion of the reaction, the desired product, S-benzoylthiamine O-monophosphate, may be isolated from the reaction mixture by the following procedure. After completion of the reaction, the chloroform layer, if necessary, after addition of water to the reaction mixture, is separated and the aqueous layer, with or without concentration, is then acidified with an acid such as hydrochloric or sulfuric acid (for example, to pH of about 3.5–4) and the precipitates of S-benzoylthiamine O-monophosphate thus formed are isolated by filtration.

As is in the case under item II, this process is a novel acylation reaction since dibenzoyl disulfide has not been hithertofore used in acylation of thiol derivative compounds and therefore it has not been expected that dibenzoyl disulfide can be used for the acylation of thiol-type thiamine compounds.

S-benzoylthiamine O-monophosphate obtained in the processes stated above is a crystalline compound which is stable, resistant to heat and light, non-hygroscopic and possessing no odor characteristic in the usual thiamine derivatives. It can be therefore used in a wide variety of therapeutic and nutritional preparations. Moreover, it may be converted to the salts by the per se known methods. For example, it may be converted to calcium and sodium salts respectively with calcium and sodium hydroxides.

The following examples will illustrate the invention in greater detail, and it is to be understood that the invention is not to be limited thereto but is to be construed broadly and restricted solely by the scope of the appended claims.

Example 1

To a solution of 4.3 parts of thiamine monophosphate hydrochloride dissolved in 16 parts of water are added with ice-cooling 11 parts of 15% aqueous solution of sodium hydroxide. 2.1 parts of benzoyl chloride are added dropwise to the mixture with stirring, while maintaining the reaction mixture alkaline by occasional addition of aqueous sodium hydroxide. The resulting solution is neutralized, concentrated in vacuum and the pH is then adjusted to 3.5–4 with concentrated hydrochloric acid to precipitate crude S-benzoylthiamine O-monophosphate. The product is then suspended in water and the pH adjusted to 7.0 with addition of sodium hydroxide to a solution. The pH of the solution is adjusted with hydrochloric acid to 4.0 to give the pure product, weighing 3.4 g., M.P. about 165° C. (decomposed).

*Analysis.*—Calculated for $C_{19}H_{23}O_6N_4SP \cdot 2H_2O$: C, 45.49; H, 5.42; N, 11.15. Found: C, 45.56; H, 5.37; N, 11.02.

The thiamine monophosphate hydrochloride used for the starting material has been prepared in the following way: 28.6 g. of 84% orthophosphoric acid are heated at about 270° C. After cooled to about 100° C., 4.0 g. of thiamine hydrochloride are added to the resulting acid and heating is continued further to cease evolution of hydrochloric acid gas. The reaction mixture is poured onto ice water and acetone is aded to precipitate thiamine phosphates. The precipitates are dissolved in 17 cc. of 1 N-hydrochloric acid and the solution is allowed to stand at room temperature for about 7 days, during which period of time thiamine polyphosphate is hydrolyzed to give the monophosphate alone. Acetone is then added to the solution and the mixture is placed in an ice box to obtain thiamine monophosphate hydrochloride.

Example 2

To a solution of 3.5 parts of thiamine monophosphate dissolved in 10 parts of water are added with ice-cooling a solution of 1.2 parts of sodium hydroxide dissolved in 2.8 parts of water. To the resulting solution are added in small portions 3.6 parts of powdered sodium benzoylthiosulfate with stirring. During the reaction sodium hydroxide solution is occasionally added to maintain the reaction mixture alkaline. The reaction mixture is then filtered, pH adjusted to about 3.5–4 and it is allowed to stand to precipitate crystals of S-benzoylthiamine O-monophosphate, which is after-treated in the same way as in Example 1. Yield 4.0 parts. M.P. about 165° C. (decomposed).

Sodium benzoylthiosulfate used as the starting material in the above reaction is obtained by the following method: To a solution of 3.2 parts of sodium thiosulfate (containing 5 molecules of crystal water) dissolved in 3.2 parts of water are added 5.2 parts of ethanol. To the resulting mixture are added 2.1 parts of benzoyl chloride maintaining the temperature at about 15° C. during the addition to yield crystalline sodium benzoylthiosulfate, M. P. above 120° C. (decomposed).

Example 3

Fifty parts of ethanol are added to a solution of 3.5 parts of thiamine monophosphate dissolved in 10 parts of water. To the resulting solution is added a solution of 1.2 parts of sodium hydroxide dissolved in 2.8 parts of water, and the mixture is treated with sodium benzoylthiosulfate in the same way as in Example 2. After completion of the reaction, the ethanol is distilled off and the residue treated in the same way as in the above example to obtain 3.7 parts of the crystalline product.

Example 4

A solution of 1.2 parts of sodium hydroxide in 4.0 parts of water is added to a solution of 3.5 parts of thiamine monophosphate hydrochloride in 7 parts of water with ice-cooling. Following addition of 10 parts of methanol, the mixture is mixed with a solution of 5 parts of dibenzoyl disulfide in about 30 parts of chloroform by addition in small portions. During the reaction is occasionally added aqueous-sodium hydroxide to maintain the pH at about 12. The reaction mixture, following addition of 9 parts of water, is filtered and to the filtrate is added hydrochloric acid to make the solution slightly acid. The chloroform layer is removed and the aqueous layer is concentrated. The pH of the concentrate is then adjusted to about 4 and it is allowed to stand to precipitate crystals of S-benzoylthiamine O-monophosphate, which are purified in the same way as in Example 1. Yield 3.0 parts, M.P. about 165° C. (decomposed).

*Analysis.*—Calculated for $C_{19}H_{23}O_6N_4SP \cdot 2H_2O$: C, 45.49; H, 5.42; N, 11.15. Found: C, 45.74; H, 5.59; N, 11.10.

Example 5

To a mixture of 20 parts of S-benzoylthiamine O-monophosphate with 1,000 parts of water are gradually added 3 parts of calcium hydroxide mixed with a small amount of water to adjust pH of the mixture to about 7. The resulting mixture is filtered and the filtrate allowed to stand to precipitate crystals of calcium salt of S-benzoylthiamine O-monophosphate. The precipitates are filtered, washed with a small amount of water and dried. Yield 19.6 parts, M.P. about 170° C. (decomposed).

*Analysis.*—Calculated for $C_{19}H_{21}O_6N_4SPCa \cdot 2H_2O$: Ca, 7.41; $H_2O$ 6.67. Found: Ca, 7.38; $H_2O$ 6.63.

Example 6

To a mixture of 10 parts of S-benzoylthiamine O-monophosphate with 35 parts of water is added with stirring and ice-cooling a 10% solution of sodium hydroxide to adjust pH to about 8. The resulting solution is filtered, added with acetone and allowed to stand at cold place to precipitate crystals of sodium salt of S-benzoylthiamine O-monophosphate. The crystals are filtered at cold place and dissolved in a small amount of water. Acetone is then added to the solution to give a recrystallization of purified product, which is dried in vacuum over phosphorus pentoxide. Yield 8 parts. This product is hygroscopic and decomposes at about 150° C.

*Analysis.*—Calculated for $C_{19}H_{21}O_6N_4SPNa_2$: C, 44.71; H, 4.15; Na, 9.01. Found: C, 44.53; H, 4.10, Na, 9.16.

What we claim is:

1. A compound selected from the group consisting of a compound of the formula

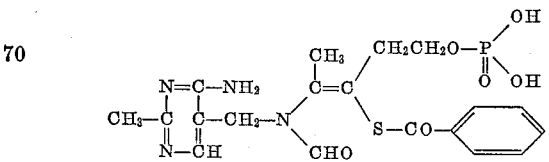

and the sodium and calcium salts thereof.

2. S-benzoylthiamine O-monophosphate.

3. The sodium salt of S-benzoylthiamine O-monophosphate.

4. The calcium salt of S-benzoylthiamine O-monophosphate.

5. A process for preparing S-benzoylthiamine O-monophosphate which comprises reacting thiamine monophosphate with sodium benzoylthiosulfate at pH of about 7–14 in water to form S-benzoylthiamine O-monophosphate and isolating S-benzoylthiamine O-monophosphate formed from the reaction mixture.

6. A process for preparing S-benzoylthiamine O-monophosphate which comprises treating a distribution of thiamine monophosphate in water with a solution of dibenzoyl disulfide dissolved in organic solvent and isolating the desired S-benzoylthiamine O-monophosphate from the aqueous layer obtained by separation of the organic solvent layer.

7. Process in accordance with claim 5, wherein the water is admixed with an organic solvent.

8. A process for preparing S-benzoylthiamine O-monophosphate which comprises reacting thiamine monophosphate distributed in an admixture of water and organic solvent with a solution of dibenzoyl disulfide dissolved in organic solvent and isolating the desired S-benzolythiamine O-monophosphate from the aqueous layer obtained by separation of the organic solvent layer.

References Cited in the file of this patent

UNITED STATES PATENTS

| | | |
|---|---|---|
| 2,592,931 | Matsukawa et al. | Apr. 15, 1952 |
| 2,752,348 | Matsukawa et al. | June 26, 1956 |
| 2,833,768 | Fujiwari et al. | May 6, 1958 |

OTHER REFERENCES

Kawasaki: J. Pharm. Soc. Japan, vol. 76, pp. 543–5 (1956).